United States Patent [19]
Tasker et al.

[11] Patent Number: 5,855,416
[45] Date of Patent: Jan. 5, 1999

[54] REINFORCED VEHICLE AXLE HOUSING ASSEMBLY AND METHOD FOR REINFORCEMENT

[75] Inventors: Ian Kenneth Tasker, Liverpool; John Robert Ottewill, Castelton Rochdale, both of England

[73] Assignee: Eaton Corporation, Cleveland, Ohio

[21] Appl. No.: 759,030

[22] Filed: Dec. 2, 1996

[30] Foreign Application Priority Data

Dec. 23, 1995 [GB] United Kingdom .................... 9526492

[51] Int. Cl.$^6$ .................................................. B60B 35/12
[52] U.S. Cl. ...................... 301/124.1; 188/18 A; 74/607
[58] Field of Search .................... 301/124.1, 125, 301/126, 129, 130, 131, 132, 137, 6.1, 6.8; 74/607; 188/18 A, 52

[56] References Cited

U.S. PATENT DOCUMENTS

| | | | |
|---|---|---|---|
| 1,762,407 | 6/1930 | Mogford et al. ................. | 301/124.1 X |
| 1,873,453 | 8/1932 | Mogford et al. ................. | 301/124.1 X |
| 2,480,833 | 9/1949 | Buckendale ................. | 74/607 |
| 2,569,452 | 10/1951 | Ruckendale ................. | 74/607 |
| 3,980,159 | 9/1976 | Baxendale ................. | 188/18 A X |
| 4,729,455 | 3/1988 | May ................. | 301/6.8 X |

FOREIGN PATENT DOCUMENTS

| | | | |
|---|---|---|---|
| 544626 | 2/1932 | Germany ................. | 301/124.1 |
| 35678 | 6/1935 | United Kingdom ................. | 301/124.1 |
| 984102 | 2/1965 | United Kingdom ................. | 301/137 |

*Primary Examiner*—Russell D. Stormer

[57] ABSTRACT

A reinforced vehicle axle housing assembly includes a housing having an arm section including an axial portion adapted to receive a brake flange and a sleeve disposed in a cavity defined by the arm section. The sleeve at least partially overlaps the axial portion and is in reinforcing engagement with the arm section. The housing is formed by first and second housing halves joined together by a housing weld along the neutral axis. The housing weld penetrates through the arm section and secures the sleeve to the housing. A method for reinforcing a vehicle axle housing includes the steps of positioning a sleeve in the cavity so as to be encircled by the axial portion and securing the sleeve within the cavity so as to reinforce the arm section.

20 Claims, 3 Drawing Sheets

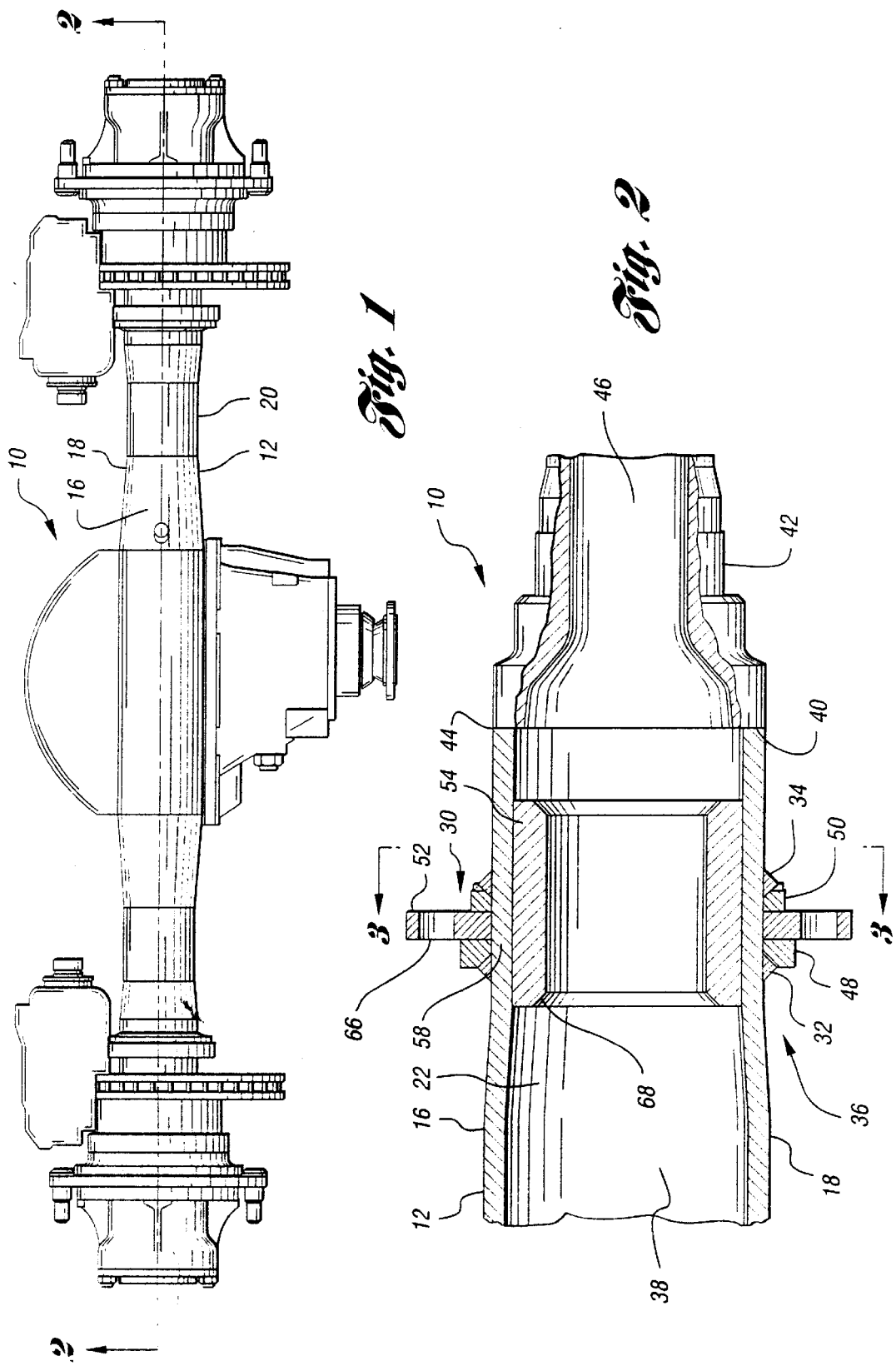

REINFORCED VEHICLE AXLE HOUSING ASSEMBLY AND METHOD FOR REINFORCEMENT

TECHNICAL FIELD

The present invention relates to a reinforced vehicle axle housing assembly and method for reinforcement.

BACKGROUND ART

In heavy duty vehicles, a conventional rear axle housing assembly for heavy duty brake adaptation generally includes a housing formed by first and second housing halves. The housing halves are joined together by a housing weld along the neutral axis. Each side of the housing includes an arm section that is friction welded at its end to a spindle end. Each arm section includes an axial portion adapted to receive a brake assembly thereon.

Conventionally, drum type brakes have been used for the rear axle brakes of heavy duty vehicles. However, it is known that disc brakes have numerous advantages over drum brakes. Generally, disc brakes tend to have greater stability to provide braking without weaving and to provide straight-line stops. Further, disc brakes are better balanced for equalized braking and are able to provide shorter stopping distances than those provided by conventional drum type brakes.

Due to increasing customer demands for improved brake performance, there is a need for rear disc type brakes on heavy duty vehicles.

SUMMARY OF THE INVENTION

It is, therefore, an object of the present invention to provide a reinforced vehicle axle housing assembly for rear disc brake adaptation on a heavy duty vehicle and method for reinforcing the same.

It is a further object of the present invention to provide an improved vehicle axle housing assembly for a heavy duty vehicle that is designed to avoid significant stress discontinuities in the portion of the arm section that receives the brake flange assembly, and that meets resonant fatigue life standards while substantially minimizing the weight increase of the assembly that is necessary for proper retention of the brake flange assembly to the arm section when subjected to significant torsional and bending stresses during operation.

In carrying out the above objects and other objects and features of the present invention, an axle housing assembly for a vehicle is provided. The axle housing assembly includes a housing having an arm section. The arm section includes an axial portion adapted to receive a brake flange. A cavity is defined by the arm section and a sleeve is disposed in the cavity. The sleeve at least partially overlaps the axial portion of the arm section and is in reinforcing engagement with the arm section.

In a preferred construction, a brake flange is secured to the axial portion of the arm section by first and second circumferential welds on axially opposite sides of the brake flange. The sleeve is preferably sized in length so as to extend axially beyond both welds. The welds extend substantially around the housing and are formed so as to avoid significant stress discontinuities.

The advantages accruing to the present invention are numerous. For example, the vehicle axle housing assembly of the present invention provides reinforced attachment of the brake assembly while providing localized reinforcement of the housing. Further, the vehicle axle housing assembly of the present invention substantially minimizes the increase in weight of the axle housing assembly that is needed for proper reinforcement.

The above objects and other objects, features and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 1 is a plan view of an axle housing assembly made in accordance with the present invention;

FIG. 2 is a cross-sectional view of the axle housing assembly of FIG. 1 taken along line 2—2 of FIG. 1 showing the arm section and sleeve arrangement;

BEST MODES FOR CARRYING OUT THE INVENTION

Figure 3:
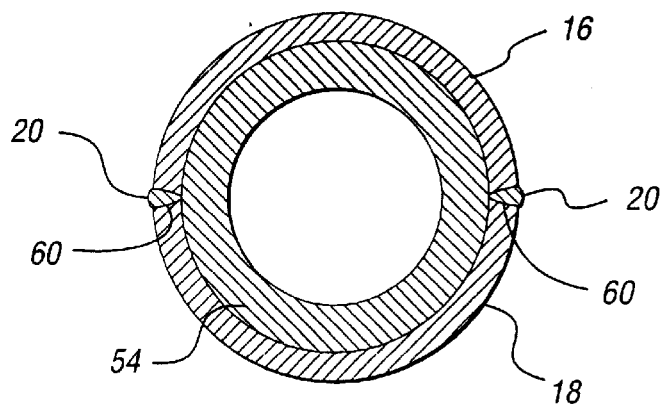
FIG. 3 is a cross-sectional view of FIG. 2 taken along line 3—3 of FIG. 2 showing the housing weld penetration along the neutral axis.

Referring now to FIGS. 1 and 2, there is illustrated an axle housing assembly made in accordance with the present invention, indicated generally by reference numeral 10. The axle housing assembly 10 includes a housing 12 formed by a first housing half 16 and a second housing half 18. A housing weld 20 along the neutral axis joins the first and second housing halves 16 and 18, respectively, together. The housing 12 has an arm section 22 on each side of axle housing assembly 10. A brake flange assembly 30 is secured to housing 12 by a pair of circumferential welds 32 and 34.

Referring to FIGS. 2 and 3, arm section 22 and the surrounding elements will be further described. Arm section 22 includes an axial portion 36 adapted to receive brake flange assembly 30. Arm section 22 defines a cavity 38 for receiving a shaft therethrough. At an end 40 of arm section 22, a spindle end 42 is secured by a friction weld 44. Spindle end 42 defines a passage 46 in communication with cavity 38.

Brake flange assembly 30 includes inner and outer collars 48 and 50, respectively, and a brake flange 52. First circumferential weld 32 and second circumferential weld 34 are of the fillet type and are on axially opposite sides of the brake flange assembly 30.

A sleeve 54 is disposed in cavity 38, and is encircled by axial portion 36. Sleeve 54 is in reinforcing engagement with arm section 22. Sleeve 54 and arm section 22 are preferably sized to produce an interference fit preferably ranging from about zero to about 0.25 mm total interference between sleeve 54 and arm section 22. Axial portion 36 and sleeve 54 cooperate to define an overlap region 58. Sleeve 54 is encircled by overlap region 58. Preferably, sleeve 54 extends axially beyond the first and second welds 32 and 34, respectively, so that axial portion 36 is completely overlapped by sleeve 54. This defines overlap region 58 as the entire axial portion 36 and both circumferential welds 32 and 34. Sleeve 54 preferably extends about 25 mm to about 30 mm beyond each weld 32 and 34. It should be appreciated that this range will vary for different housing designs, and that a greater or lesser extension may provide proper support.

With continuing reference to FIGS. 2 and 3, housing weld 20 has a penetrating portion 60. Penetrating portion 60 penetrates through arm section 22 and secures sleeve 54 to housing 12.

First and second circumferential welds 32 and 34, respectively, extend substantially about housing 12 and are formed so as to avoid significant stress discontinuities. Sleeve 54 is positioned within cavity 38 so as to reinforce the circumferential welds 32 and 34, respectively. Preferably, first and second welds 32 and 34, respectively, extend about 360° around housing 12 and eliminate significant stress discontinuities such as those that may occur at weld end points in a weld substantially less than 360°, i.e. a weld of about 240°. Sleeve 54 reinforces the arm section 22, and substantially increases fatigue life in the presence of the circumferential welds 32 and 34. It should be appreciated that there are several alternatives to a 360° circumferential weld. For example, the weld may extend about the housing for less than 360°, but sufficient welding power is used to substantially affect the weld free area intermediate the weld end points. This could create a surface that substantially avoids significant stress discontinuities. Further, the circumferential welds 32 and 34 could extend beyond 360°, and still be formed so as to avoid significant stress discontinuities.

First and second circumferential welds 32 and 34, respectively, provide additional strength for the brake assembly 30 during braking as torsional stresses are induced on the axial portion 36. Further, it should be appreciated that sleeve 54 will provide increased fatigue life for other weld configurations about axial portion 36. Sleeve 54 will provide support and reinforcement for an arm section region having equivalent characteristics to the previously described axial portion 36, when the sleeve is positioned into reinforcing engagement therewith. Such regions may be determined by computer simulation such as finite element analysis.

In a preferred construction, housing 12 is formed of a micro-alloy having an ultimate tensile strength ranging from about 550 to about 700 MPa and a yield strength of about 450 MPa. In particular, CR 450 C-MN-NB steel could be used. Sleeve 54 is preferably formed of the same material, or a similar material such as EN14B (SAE 1527). Brake flange 52 is preferably formed of EN 8 (SAE 1020). When selecting materials for housing 12 or sleeve 54, expansion and contraction coefficients should be considered. Particular attention should be given to the forming of the housing weld 20, the circumferential welds 32 and 34, and any induced or residual stresses or metal property modifications resulting therefrom. For example, in a circumferential weld extending 240° around the housing, the area intermediate the weld end points may become brittle due to heat from the welding process. This is avoided by using welds that extend approximately 360°.

With continuing reference to FIGS. 2 and 3, housing weld 20 includes first and second weld sections; the second weld section includes penetrating portion 60 of housing weld 20. During weld forming, the first weld section is formed with sufficient welding power to join the first and second housing halves 16 and 18, respectively, together. The penetrating portion 60 is formed with sufficient welding power to penetrate through the arm section 22 and secure sleeve 54 to housing 12. For example, during production, the welding gun may be slowed down as it passes by the arm section seam to provide sufficient penetration, or the weld gun may be supplied with additional power to achieve a similar result.

With continuing reference to FIGS. 2 and 3, a preferred construction of axle housing assembly 10 will be further described. Collars 48 and 50 are secured to the axle housing 12 by 360° continuous fillet welds. The brake flange 52 has apertures 66 for receiving and securing additional brake assembly elements such as the adaptor plate which is also preferably formed of EN 8 (SAE 1020). The sleeve 54 preferably has a wall thickness of about 19.5 mm to support an arm section 22 having a wall thickness of about 11.0 mm. This provides substantial reinforcement of the arm section 22. The sleeve 54 is shown having an internal chamfer 68 on each end.

Figure 4:
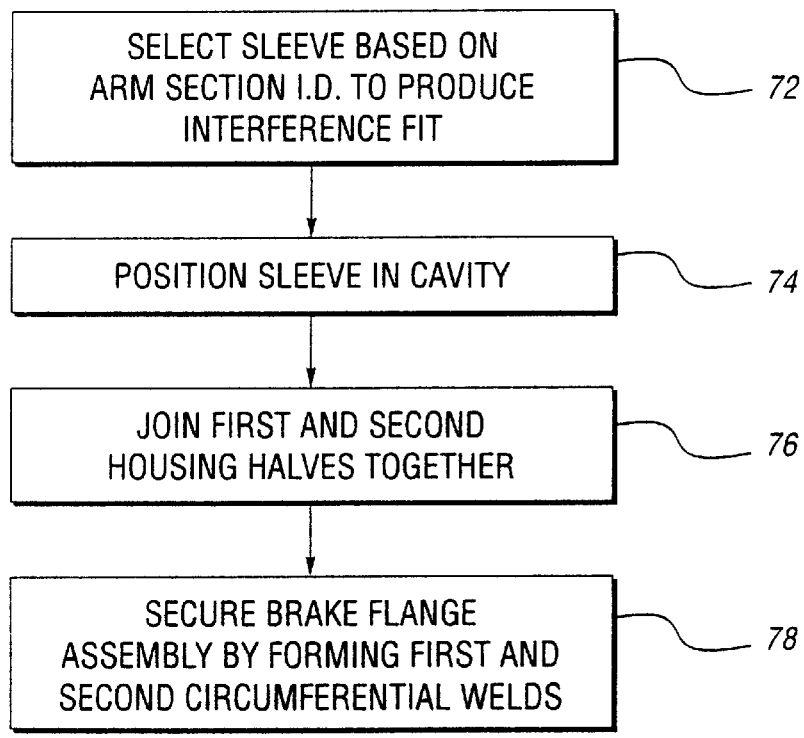
FIG. 4 is a block diagram illustrating a method for reinforcing an axle housing assembly for a vehicle in accordance with the present invention.

With reference now to FIG. 4, a method of reinforcing an axle housing according to the present invention will now be described. At block 72, a sleeve, such as sleeve 54, is selected based on arm section internal diameter. The sleeve is selected from a plurality of differently sized sleeves so as to produce a preferred interference fit of about zero to about 0.25 mm total interference between the sleeve 54 and arm section 22. Due to slightly varying arm section internal diameters, sleeves are preferably fitted for each assembly. One way to achieve this is by maintaining a plurality of differently sized sleeves available for use in a housing during production. In the case where the arm section has a tapered internal surface or other type of surface, the sleeves are manufactured accordingly to produce the preferred fit. Additionally, the plurality of differently sized sleeves available for selection are preferably of sufficient length to reinforce both circumferential welds 32 and 34. For example, a sleeve which extends about 25 mm to 30 mm beyond each circumferential weld will sufficiently reinforce the welds in the housing assembly described previously.

At block 74, sleeve 54 is positioned in cavity 38. Once sleeve 54 is positioned in cavity 38, between housing halves 16 and 18, axial portion 36 encircles sleeve 54, and preferably completely overlaps sleeve 54. That is, overlap region 58 includes all of the axial portion 36 of arm section 22 that is adapted for securing the brake flange assembly 30 and includes both circumferential welds 32 and 34. Further, as previously described, the sleeve 54 may be positioned so as to reinforce regions of arm section 22 as determined by computer simulation to increase fatigue life. During computer simulation, the arm section 22 may be analyzed to determine an average stress concentration or average stress function based in part on externally applied forces. The region to be reinforced could be defined by significant deviations from the average stress concentrations in the region. For example, a weld end point will experience such deviations from the surrounding region.

At block 74, sleeve 54 is placed into a housing half and may be tack welded into position. After the sleeve is selected as represented by block 72 and positioned as represented by block 74, the first and second housing halves 16 and 18, respectively, are joined at block 76 along the neutral axis, as previously described.

At block 78, the brake flange assembly 30 is secured to the axial portion 36 of arm section 22. Axial portion 36 receives brake flange assembly 30 which is preferably centered about sleeve 54. Brake flange assembly 30 may be located by any other conventional locating method.

Types of housings that could be reinforced by a sleeve, such as sleeve 54, are any tandem or single axle designs for coach or truck applications. Typically, housings formed of half pressings such as housing halves 16 and 18 are preferred. The brake flange assembly is preferably secured to the arm section by a 360° continuous fillet weld, and the sleeve reinforces the arm section.

During design testing, finite element analysis of the circumferential welds was performed for a housing having 240° welds, and a housing having 360° welds. The housings were tested at 27,000 N·m brake torque. The weld end points of the 240° welds showed stresses of about 800 to 900 MPa. This transfers considerable stress onto the brake flange adaptor plate. By extending the circumferential welds to about 360°, the stress discontinuities were substantially eliminated and the stresses along each weld reduced to about 204 MPa near inner collar 48 and 200 MPa near outer collar 50.

Figure 5:
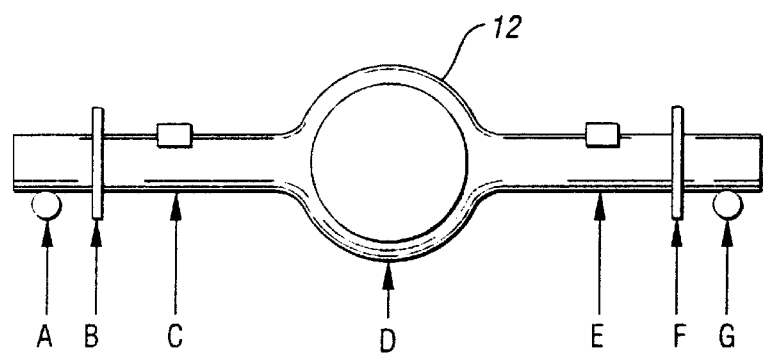
FIG. 5 is a schematic diagram illustrating deflection testing of an axle housing assembly in accordance with the present invention.
Figure 6:
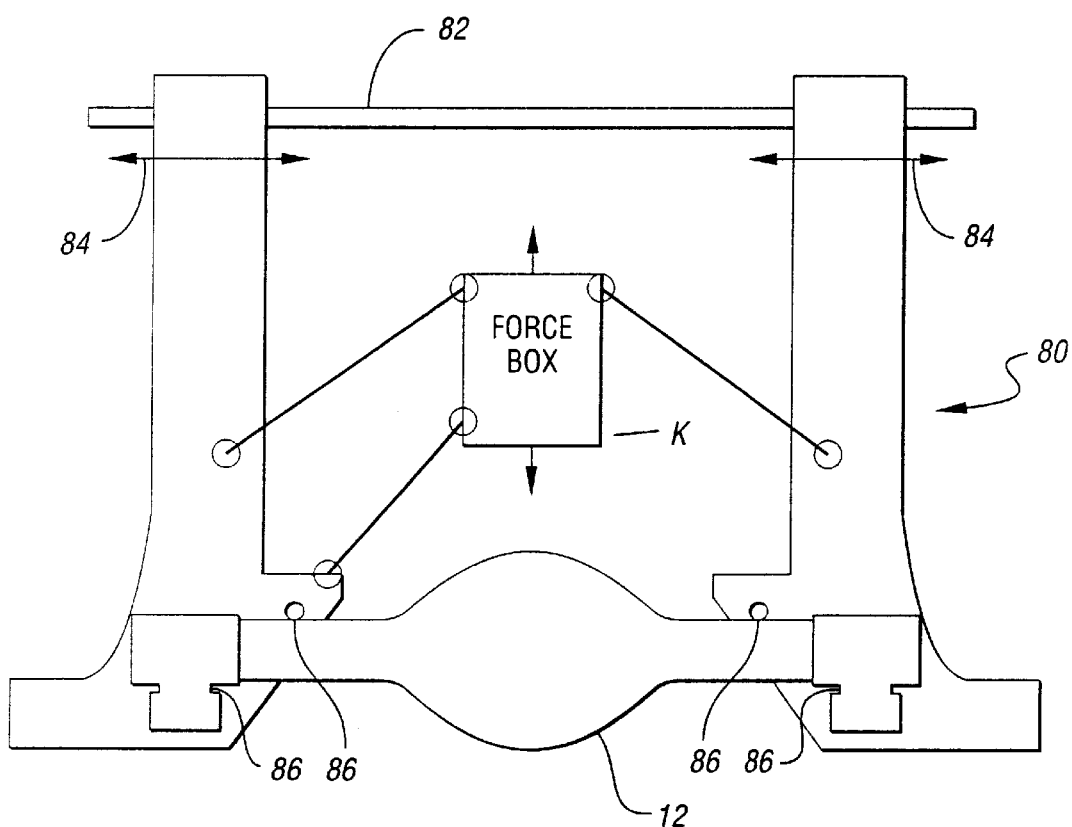
FIG. 6 is a schematic diagram illustrating resonant testing of an axle housing assembly in accordance with the present invention.

With reference to FIGS. 5 and 6, the deflection and resonant testing procedures for a housing assembly made in accordance with the present invention will be now described.

In a static deflection test, deflection indicators are positioned at points A, B, C, D, E, F, and G as shown in FIG. 5. The housing 12 being tested is loaded up to twice the rated load during testing. This test is usually performed on one housing from each group of housings to be tested, the fatigue test being performed on all. The deflection test results are used in combination with the results of fatigue testing to predict housing strength. The testing rig and resonant fatigue test will now be described.

In a resonant fatigue test, used as a basis to determine predicted fatigue life, the housing undergoes cyclic loading. To pass the test, the housing must undergo a minimum requirement such as 300,000 cycles without failure. A testing rig is generally indicated at 80. The housing 12 is manually loaded to around 500 kg (plus or minus 50 kg) using stretcher bars 82. The static loading is indicated by arrows 84. The minimum dynamic load is about 2200 kg, the maximum dynamic load is determined in response to the rated axle load and the points of load application 86.

Under standard loading conditions, the maximum for the dynamic load is twice the rated load for the axle housing assembly being tested. Under extended loading conditions, for example, simulating twin tires on each side of the axle, the maximum load is reduced slightly. The extended loading points are farther apart than the standard loading points.

A dynamic force generator or force box, indicated at K, increases its frequency until resonance is achieved. The test is continued until 1,000,000 cycles or housing failure occurs. Housing failure is usually indicated by a drop in resonant frequency or inability to maintain a dynamic load. Generally, a through crack of about 50 mm is considered failure. A housing having a 360° welded brake flange, without a sleeve, fails the resonant fatigue test in about 57,000 cycles, at the minimum. However, the improved housing having the 360° welded brake flange and the sleeve insert to increase fatigue life has reduced stresses around the weld area and passes the resonant fatigue test at about 301,000 cycles, at the minimum.

Rear axle disc brakes have been attempted in heavy duty vehicles having rated axle loads of about 6½ to 7 tons. Braking torque from the rear axle disc brakes is in the range of about 7000 N·m. To overcome any problems of the brake flange breaking loose from the housing, the disc brakes may be improved by incorporating the 360° weld along with a sleeve insert. The 360° weld secures the brake flange, and the sleeve provides sufficient fatigue life.

Heavy duty vehicle rear axles which receive axle loads of about 12½ tons require much greater braking torques, and the problem of the brake flange breaking loose is much more apparent. In a heavy duty vehicle, the 360° weld along with the sleeve insert allows for rear axle disc brake adaptation for heavy duty braking torques in the range of about 27,000 N·m.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. A rear axle housing assembly for rear disk brake adaptation in a heavy duty vehicle, the rear axle housing assembly including a housing having an arm section including an axial portion adapted to receive a brake flange, the arm section defining a cavity and having an end, the rear axle housing assembly further comprising:

a sleeve disposed in the cavity and at least partially overlapping the axial portion, the sleeve being in reinforcing engagement with the arm section and not extending substantially beyond the arm section end; and a spindle end secured to the arm section end.

2. The rear axle housing assembly of claim 1 wherein the sleeve and the arm section are sized to produce an interference fit ranging from about zero to about 0.25 mm total interference between the sleeve and the arm section.

3. The rear axle housing assembly of claim 2 wherein the housing is formed by a first housing half and a second housing half, the first and second housing halves being joined together by a housing weld, the housing weld penetrating through the arm section and securing the sleeve to the housing.

4. The rear axle housing assembly of claim 3 further comprising:

a brake flange secured to the axial portion by first and second circumferential welds on axially opposite sides of the brake flange, each of the first and second welds extending substantially around the housing so as to avoid significant stress discontinuities about the welds during brake operation, wherein the sleeve extends sufficiently beyond each of the first and second welds so as to increase fatigue life of the housing.

5. The rear axle housing assembly of claim 4 wherein the sleeve extends axially about 25 mm to about 30 mm beyond each of the first and second welds.

6. The rear axle housing assembly of claim 4 wherein the first and second welds extend less than 360° around the housing.

7. The rear axle housing assembly of claim 3 further comprising:

a brake flange secured to the axial portion by at least one circumferential weld, the at least one weld extending substantially around the housing and formed so as to avoid significant stress discontinuities around the at least one weld, the sleeve being positioned so as to be reinforce the housing at the least one weld.

8. A method of making an axle housing assembly for a vehicle, the axle housing assembly including a housing having an arm section including an axial portion adapted to receive a brake flange, the arm section defining a cavity and having an end, the method comprising:

positioning a sleeve in the cavity so as to be encircled by the axial portion;

securing the sleeve within the cavity so as to reinforce the arm section with the sleeve not extending substantially beyond the arm section end; and securing a spindle end to the arm section end.

9. The method of claim 8 wherein positioning further comprises:

determining an arm section region defined by a stress concentration that is substantially greater than an average stress concentration of the arm section; and positioning the sleeve into reinforcing engagement with the region so as to increase fatigue life of the housing.

10. The method of claim 8 wherein positioning further comprises:

selecting the sleeve from a plurality of differently sized sleeves based on arm section internal dimensions so as to produce an interference fit between the sleeve and the arm section.

11. The method of claim 10 wherein the interference fit ranges from about zero to about 0.25 mm total interference between the sleeve and the arm section.

12. The method of claim 8 wherein the housing includes a first housing half and a second housing half, the method further comprising:

joining the first and second housing halves together by forming a housing weld along a neutral axis, the housing weld being formed so as to penetrate through the arm section and secure the sleeve to the housing.

13. The method of claim 8 wherein the axle housing assembly includes a brake flange securable to the axial portion, the method further comprising:

securing the brake flange to the axial portion by forming first and second circumferential welds on axially opposite sides of the brake flange, each of the first and second welds being formed so as to avoid significant stress discontinuities about the welds during brake operation; and selecting the sleeve based on weld placement so that the sleeve extends axially beyond each of the first and second welds so as to reinforce the arm section around the first and second welds.

14. The method of claim 13 wherein the sleeve is selected so as to extend from about 25 mm to about 30 mm beyond each of the first and second welds.

15. The method of claim 8 wherein the axle housing assembly includes a brake flange securable to the axial portion, the method further comprising:

securing the brake flange to the axial portion by forming at least one circumferential weld extending substantially around the arm section so as to avoid significant stress discontinuities as determined by computer simulation about the at least one weld; and selecting the sleeve so that the sleeve extends sufficiently axially along the arm section on both sides of the at least one weld so as to increase fatigue life of the housing.

16. The method of claim 8 wherein positioning further comprises:

positioning the sleeve so that the axial portion of the arm section partially overlaps the sleeve.

17. An axle housing assembly for a vehicle, the axle housing assembly including a housing having an arm section including an axial portion, the arm section defining a cavity and having an end, the axle housing assembly further comprising:

a sleeve disposed in the cavity and encircled by the axial portion, the sleeve being in reinforcing engagement with the arm section and not extending substantially beyond the arm section end, wherein the housing is formed by a first housing half and a second housing half, the first and second housing halves being joined together by a housing weld along a neutral axis, the housing weld penetrating through the arm section and securing the sleeve to the housing;

a spindle end secured to the arm section end; and a brake flange secured to the axial portion by first and second circumferential welds on axially opposite sides of the brake flange, each of the first and second welds extending approximately 360° around the housing so as to avoid significant stress discontinuities during brake operation, wherein the sleeve extends axially beyond each of the first and second welds so as to increase fatigue life of the housing.

18. The axle housing assembly of claim 17 wherein the sleeve and the arm section are sized to produce an interference fit ranging from about zero to about 0.25 mm total interference between the sleeve and the arm section.

19. The axle housing assembly of claim 17 wherein the sleeve extends axially about 25 mm to about 30 mm beyond each of the first and second welds.

20. The axle housing assembly of claim 17 wherein the sleeve has a sleeve wall thickness greater than an average wall thickness of the axial portion.

\* \* \* \* \*